United States Patent
Keramidas et al.

(10) Patent No.: US 10,510,133 B2
(45) Date of Patent: Dec. 17, 2019

(54) ASYMMETRIC MULTI-CORE HETEROGENEOUS PARALLEL PROCESSING SYSTEM

(71) Applicant: THINK SILICON SA, Patras (GR)

(72) Inventors: Georgios Keramidas, Patras (GR); Iakovos Stamoulis, Patras (GR); George Sidiropoulos, Patras (GR)

(73) Assignee: THINK SILICON SA, Patras (GR)

( * ) Notice: Subject to any disclaimer, the term of this patent is extended or adjusted under 35 U.S.C. 154(b) by 0 days.

(21) Appl. No.: 15/687,776

(22) Filed: Aug. 28, 2017

(65) Prior Publication Data

US 2018/0365792 A1 Dec. 20, 2018

Related U.S. Application Data

(60) Provisional application No. 62/522,172, filed on Jun. 20, 2017.

(51) Int. Cl.
*G06T 1/20* (2006.01)
*G06F 9/30* (2018.01)
(Continued)

(52) U.S. Cl.
CPC ............ *G06T 1/20* (2013.01); *G06F 9/30014* (2013.01); *G06F 9/30185* (2013.01);
(Continued)

(58) Field of Classification Search
None
See application file for complete search history.

(56) References Cited

U.S. PATENT DOCUMENTS

| | | |
|---|---|---|
| 8,762,602 B2 | 6/2014 | Feng et al. |
| 9,087,161 B1 | 7/2015 | Diamond |

(Continued)

OTHER PUBLICATIONS

Menard et al. "Floating-to-Fixed-Point Conversion for Digital Signal Processors", EURASIP Journal on Applied Signal Processing, vol. 2006, Article ID 96421, pp. 1-19 (Year: 2006).*

(Continued)

*Primary Examiner* — Yingchun He
(74) *Attorney, Agent, or Firm* — Jason H. Vick; Sheridan Ross, PC

(57) ABSTRACT

A multi-core asymmetric graphics processing unit (GPU) includes a first group and second group of GPU cores. The first group of GPU cores has a first microarchitecture and a first power consumption profile. The first group of GPU cores is configured to execute a subset of instructions of an instruction set architecture (ISA). The second group of GPU cores have a second microarchitecture and a second power consumption profile higher than the first power consumption profile, and are configured to execute the entire ISA. The first group and second group of GPU cores may be further differentiated by a number of pipeline stages, number of registers, branching execution, vectorization units, or combinations thereof. A subset of GPU cores in either group may have a different operation frequency. In some embodiments, an executable instruction may include an indicator to ascertain if execution is performed by the first or second group of GPU cores.

19 Claims, 5 Drawing Sheets

(51) Int. Cl.
*G06F 9/38* (2018.01)
*G06F 9/46* (2006.01)
*G06T 15/04* (2011.01)
*G06T 1/60* (2006.01)

(52) U.S. Cl.
CPC .............. *G06F 9/3836* (2013.01); *G06F 9/46* (2013.01); *G06T 1/60* (2013.01); *G06T 15/04* (2013.01)

(56) References Cited

U.S. PATENT DOCUMENTS

| | | | |
|---|---|---|---|
| 9,342,477 B2 | 5/2016 | Yap et al. | |
| 2002/0133593 A1* | 9/2002 | Johnson | G06Q 10/10 709/226 |
| 2002/0158865 A1* | 10/2002 | Dye | G06T 11/40 345/419 |
| 2009/0295816 A1* | 12/2009 | Kallio | G06T 15/005 345/553 |
| 2013/0314425 A1* | 11/2013 | Hum | G06F 1/3203 345/502 |
| 2014/0298060 A1 | 10/2014 | Hooker et al. | |

OTHER PUBLICATIONS

Smith et al. "Asymmetric Multiprocessing for Simultaneous Multithreading Processors", North Carolina State University, 2006 (Year: 2006).*
Wilt "GPU Programming and Streaming Multiprocessors", downloaded @http://www.informit.com/articles/article.aspx?p=2103809&seqNum=3, posted Aug. 6, 2013 (Year: 2013).*
U.S. Appl. No. 16/515,172, filed Jul. 18, 2019, Keramidas et al.

* cited by examiner

ASYMMETRIC MULTI-CORE HETEROGENEOUS PARALLEL PROCESSING SYSTEM

RELATED APPLICATION DATA

This application claims the benefit of and, under 35 U.S.C. § 119(e), priority to, U.S. Provisional Patent Application No. 62/522,172, filed Jun. 20, 2017, entitled "An Asymmetric Multi-Core Heterogeneous Parallel Processing System," which is incorporated herein by reference in its entirety.

FIELD

An exemplary aspect relates to graphic processor units and particularly to multi-core graphic processor units and variants thereof.

BACKGROUND

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not be assumed to have been recognized in any prior art on the basis of this section, unless otherwise indicated.

Many devices, such as internet of things devices, today include a display unit. For many of these, the largest power consumption is due to the display, and associated processors. Optimizing the processors may allow smaller power consumption, or the ability to perform additional tasks utilizing the same power consumption. Processor architectures are typically optimized for certain tasks, while possibly falling short in others.

Some applications include the use of asymmetrical processors, such as the art described in U.S. Pat. No. 9,087,161 "Asymmetrical scaling multiple GPU graphics system for implementing cooperative graphics instruction execution," to Diamond. As best understood, Diamond describes using multiple graphic processor units (GPUs) which are asymmetrical (different in their rendering capability), for scaling rendering capabilities to a computer system. Such a system is complex, and may require an overhead for each GPU of generating an instruction set corresponding to the workload of the specific GPU, which may only run on the same.

BRIEF DESCRIPTION OF THE DRAWINGS

The foregoing and other aspects, features and advantages will become apparent and more readily appreciated from the following detailed description taken in conjunction with the accompanying drawings, in which.

DETAILED DESCRIPTION

Figure 1:
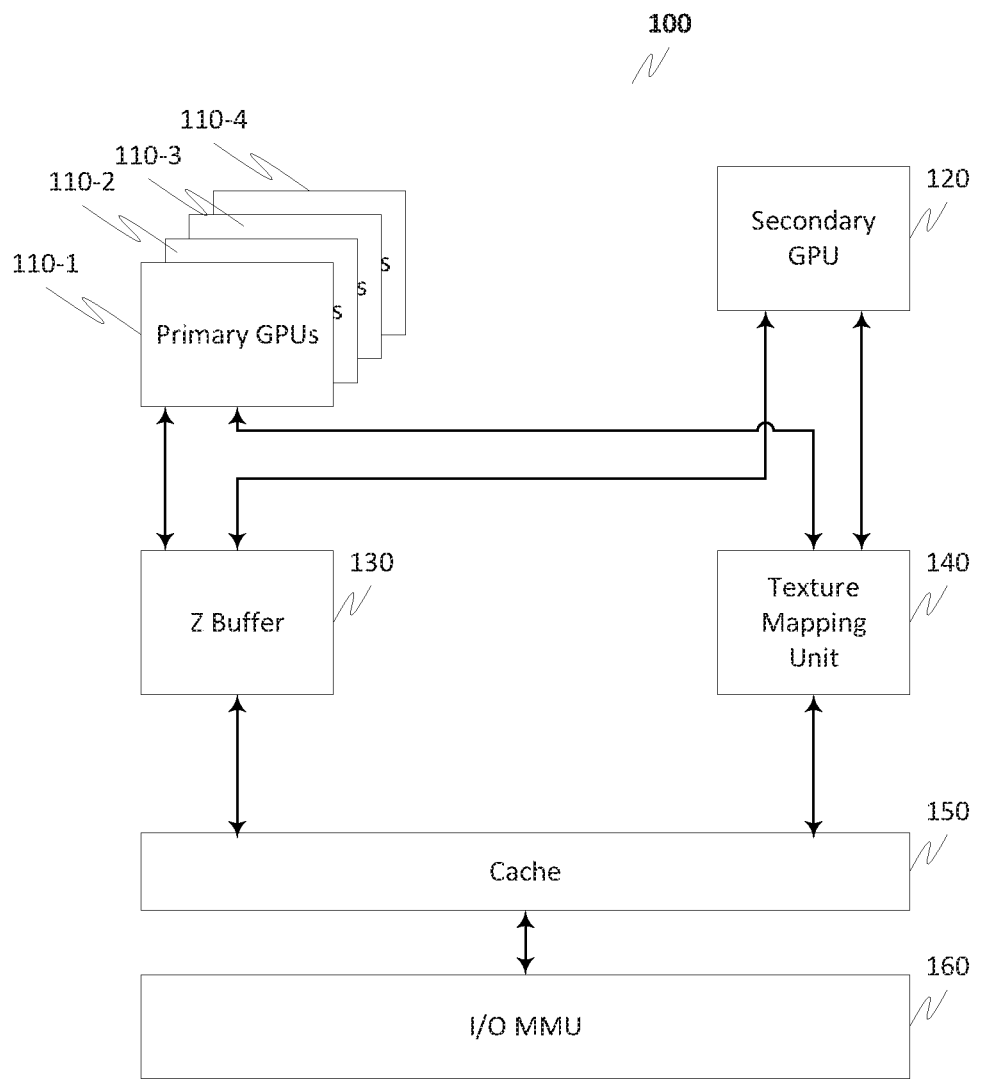
FIG. 1 is a schematic illustration of an exemplary asymmetric multi-core Heterogeneous Parallel Processing System (HPPS), implemented in accordance with some embodiments.

Exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

A multi-core asymmetric graphics processing unit (GPU) can include a first group and second group of GPU cores. The first group of GPU cores has a first microarchitecture and a first power consumption profile. The first group of GPU cores is configured to execute a subset of instructions of an instruction set architecture (ISA). The second group of GPU cores has a second microarchitecture and a second power consumption profile higher than the first power consumption profile, and are configured to execute the entire ISA. The first group and second group of GPU cores may be further differentiated by number of pipeline stages, number of registers, branching execution, vectorization units, or combinations thereof. A subset of GPU cores in either group may have a different operation frequency. In some embodiments, an executable instruction may include an indicator to ascertain if execution is performed by the first or second group of GPU cores.

The embodiments discussed herein refer to primary GPUs and secondary GPUs. It should be understood that in certain embodiments, the primary GPUs may be all implemented on a single die, or the secondary GPUs may be all implemented on another die, or the primary GPUs and the secondary GPUs may all be implemented on a single die, all without departing from the scope of the disclosure.

FIG. 1 is an exemplary and non-limiting schematic illustration of an asymmetric multi-core heterogeneous parallel processing system 100, implemented in accordance with an embodiment. The multi-core heterogeneous parallel processing system (HPPS) 100 includes a first group of homogeneous primary graphic processor units (GPUs) 110-1 through 110-4, generally referenced as first group of primary GPUs 110, and a secondary GPU 120. In some embodiments, the HPPS is implemented as a multi-core multi-processor unit. The first group of GPUs 110 may include one or more primary GPUs, each having a first microarchitecture and a first power consumption profile. A primary GPU 110 may have a fixed point data path, and a first set of instructions of an instruction set architecture (ISA). In an embodiment, the secondary GPU 120 may include one or more homogeneous secondary GPUs, each having a second microarchitecture and a second power consumption profile.

The second power consumption profile is higher than the first power consumption profile, indicating that a GPU of the secondary group consumes more power than a GPU of the primary group. In this embodiment, one secondary GPU is shown for sake of simplicity. A secondary GPU may have a floating point data path or floating point and a fixed point data path, and a second set of instructions of the ISA. The second set may include all, or a portion of, the first set of instructions. The fixed point data path of the secondary GPU may have higher precision than the fixed point data path of the primary GPU.

In an embodiment, the second set of GPU(s) may include an instruction set larger than the first set of instructions. The multi-core HPPS further includes a hardware z-buffer unit 130, coupled to the first group of primary GPUs 110 and the secondary GPU 120. Upon rendering an object, the depth of a generated pixel, equivalent to a z-coordinate, is generated by the z-buffer 130, and stored in memory. The multi-core HPPS further includes a texture mapping unit (TMU) 140. The TMU 140 may be a separate processing unit, and may be used to transform a bitmap image to an arbitrary plane of a three-dimensional space. The TMU 140 and the z-buffer unit 130 are communicatively coupled to a cache 150.

In certain embodiments, each GPU may have their own respective TMU, z-buffer unit, cache, or any combination thereof. For example, each GPU (or group of GPUs, or subgroup of GPUs) may have their own respective TMU and z-buffer unit, but share a common cache. In another embodiment, each GPU (or group of GPUs, or subgroup of GPUs) may have their own TMU, and a common z-buffer unit and cache.

The cache 150 is further communicatively coupled to an I/O memory management unit (MMU) 160. The I/O MMU 160 manages the cache, and may perform virtual memory management as needed. In the exemplary embodiment discussed above, the first group of GPUs and the second GPU are different in utilizing fixed point versus floating point or fixed point representations of different precision levels. However, in other exemplary embodiments, the difference may be the number of registers, branching behavior, vectorization units, pipeline stages, operation frequency, combinations thereof, and the like. In some embodiments, the first group of GPUs may be further divided into subgroups, where each subgroup may be further differentiated. For example, a first subgroup of the first group of GPUs may have a first operation frequency, and a second subgroup of the first group of GPUs may have a second operation frequency. In another example, the first subgroup has a cache of a first size (e.g., 1 kilobyte) and the second subgroup has a cache of a second size (e.g., 4 kilobytes).

Figure 2:
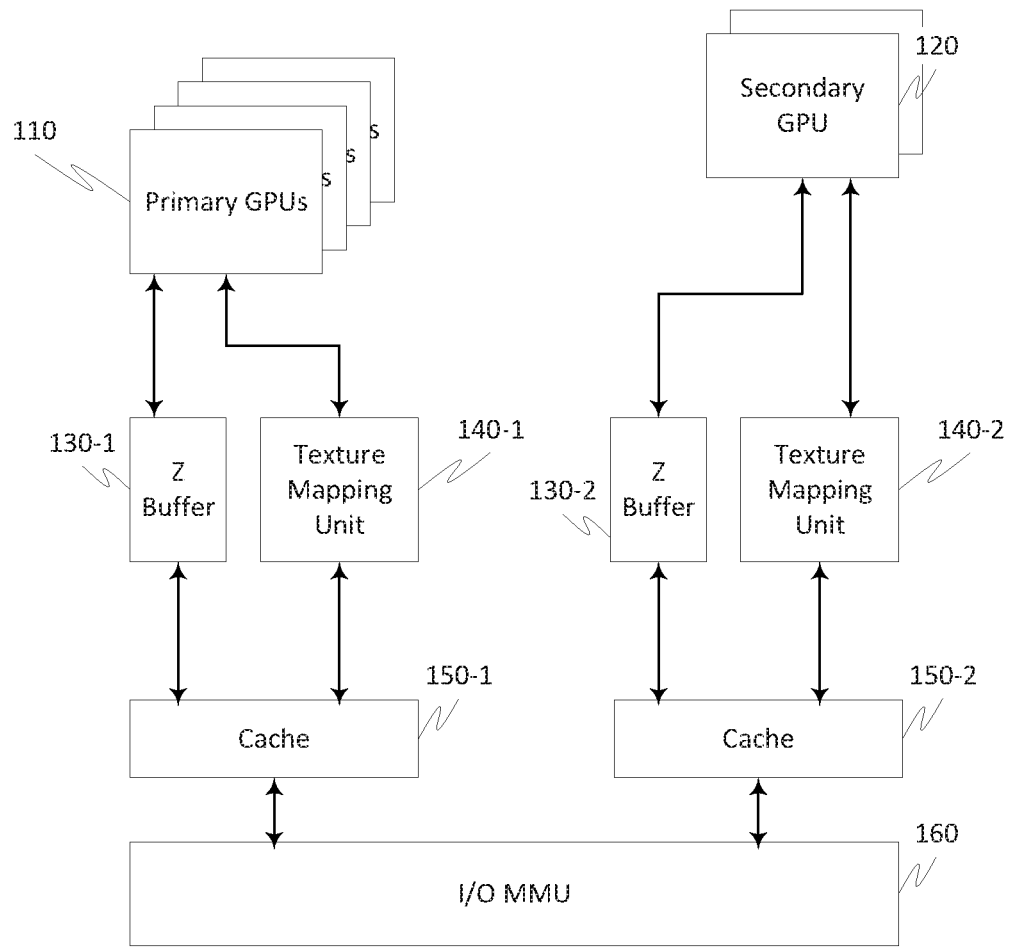
FIG. 2 is a schematic illustration of an asymmetric multi-core HPPS, implemented in accordance with some embodiments.

FIG. 2 is an exemplary and non-limiting schematic illustration of an asymmetric multi-core HPPS, implemented in accordance with another embodiment. The multi-core HPPS includes a first group of primary graphic processor units (GPUs) 110, and a second group of secondary GPUs 120. The first group 110 may include a plurality of primary GPUs. A primary GPU may have a fixed point data path or a floating point and a fixed point data path, and a first set of instructions of an instruction set architecture (ISA). The second group 120 may include a plurality of secondary GPUs. A secondary GPU may have a floating point data path, and a second set of instructions of the ISA. The second set may include all, or a portion of, the first set of instructions. In an embodiment, the second set may include an instruction set larger than the first set of instructions. The fixed point data path of the secondary GPU may have higher precision than the fixed point data path of the primary GPU.

The multi-core HPPS further includes a first hardware z-buffer 130-1, coupled to the first group of primary GPUs 110, and a second hardware z-buffer 130-2 coupled to the second group of secondary GPUs 120. Upon rendering an object, the depth of a generated pixel, equivalent to a z-coordinate, is stored in the z-buffer 130. The multi-core HPPS further includes a first texture mapping unit (TMU) 140-1 coupled to the first group of primary GPUs 110, and a second TMU 140-2 coupled to the second group of secondary GPUs 120. Each TMU may be a separate processing unit, and may be used to transform a bitmap image to an arbitrary plane of a three-dimensional space. The first TMU 140-1 and the first z-buffer 130-1 are communicatively coupled to a first cache 150-1, and the second TMU 140-2 and the second z-buffer 130-2 are communicatively coupled to a second cache 150-2. Each of the caches 150-1 and 150-2 are further communicatively coupled to an I/O memory management unit (MMU) 160. The I/O MMU 160 manages each cache, and performs virtual memory management as needed. It is understood that in any embodiment described herein, the first group of primary GPUs may include one or more primary GPUs, and the second group of secondary GPUs may include one or more secondary GPUs. The exemplary embodiments are brought for pedagogical purposes and serve no limitation on the disclosure.

Figure 3:
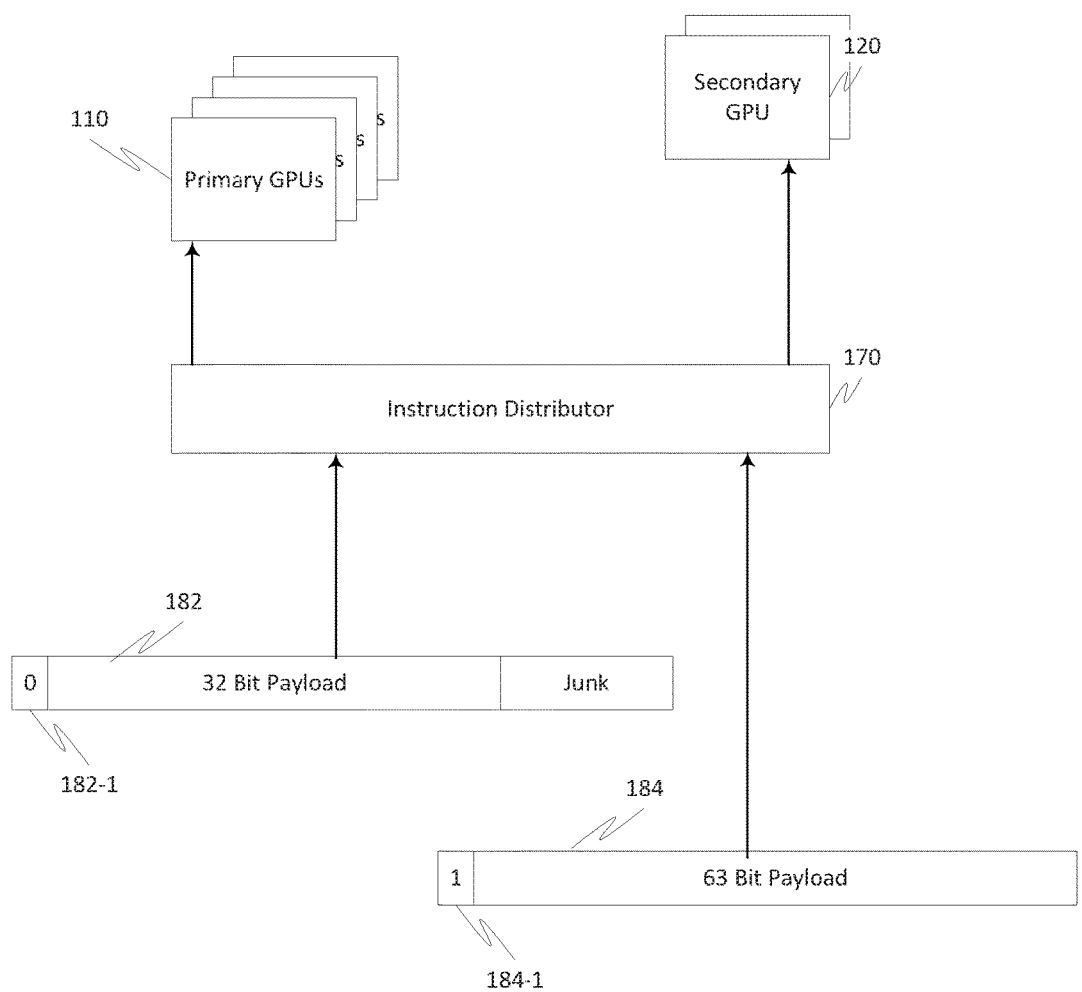
FIG. 3 is a schematic illustration of an asymmetric multi-core HPPS with an instruction distributor, implemented in accordance with some embodiments.

FIG. 3 is an exemplary and non-limiting schematic illustrating an asymmetric multi-core HPPS with an instruction distributor, implemented in accordance with an embodiment. The multi-core HPPS may further include an instruction distributor 170. The instruction distributor 170 distributes instructions of the ISA for execution by the GPUs. The instruction distributor 170 may be hardware based (implemented as circuitry), software based, or a combination thereof. In an embodiment, the instruction distributor 170 directs instructions to the relevant group of processors. For example, the ISA may include 64-bit instructions to be executed by the first group of primary processors 110, the second group of secondary processors 120, or a combination thereof. In this exemplary embodiment, the instruction distributor 170 receives a first instruction 182 and a second instruction 184. The first instruction 182 includes a flag bit 182-1, set to '0'. In an embodiment, the flag bit 182-1 indicates to the instruction distributor that this instruction is preferably executed by the first group of primary GPUs 110. However, in some embodiments the instruction distributor 170 may direct the first instruction 182 to be executed by the second group of secondary GPUs 120 for load balancing purposes. The first instruction may include a 32-bit payload, which is the executable instruction itself, and an additional 31 junk bits which may have no effect on execution.

The second instruction 184 includes a flag bit 184-1, set to '1'. In an embodiment, the flag bit 184-1 indicates to the instruction distributor 170 that this instruction should be executed by the second group of secondary GPUs 120. The instruction distributor 170 may not direct the second instruction 184 to be executed by the first group of primary GPUs 110, since they are not capable of executing this instruction, or capable of execution with reduction in quality of service (QoS) in terms of image resolution or quality of the rendered colors. The second instruction may include a 63-bit payload, which is the executable instruction itself. In an embodiment, the multi-core HPPS includes a compiler (not shown), for transforming source code into instructions which can be executed by a GPU of the first group of primary GPUs or a GPU of the second group of secondary GPUs.

In another embodiment, the instructions may be identified using another method. In such an embodiment, the instruction distributor may contain additional logic (not shown in FIG. 3) to identify if an instruction can be executed by the first group of primary GPUs, or by the second group of secondary GPUs, or by both groups. In some embodiments, the additional logic may include a circuit for extracting a register number encapsulated in an instruction and dispatch the instruction to the correct group of GPUs based on the extracted register number.

In an embodiment, the multi-core HPPS may further include a load balancer, implemented for example as a circuit, or as a software module, or as part of the instruction distributor 170. The load balancer may determine that an instruction which should be executed by a GPU of the first group of primary GPUs will be actually executed by a GPU of the second group of secondary GPUs. This may speed execution at the expense of power, and may be desirable in some embodiments. In some embodiments, the instruction includes a first portion containing instructions for alpha channel operations, a second portion containing instructions for RGB vector operations, a third portion containing memory addressing instructions for performing I/O operations to a memory, and a fourth portion containing branching instructions, which may be based on comparisons between RGB and alpha values. In some embodiments, the first group of primary GPUs and the second group of secondary GPUs may each execute the entire ISA. However, due to the nature of each group of GPUs, results of the execution will differ in quality, and/or in execution time. For example, the second instruction 184 may be executed by a primary GPU to achieve a result which is less precise (given the same time), than had the second instruction been executed by the secondary GPU 120. In some applications, this may be desirable to sacrifice image quality (or quality of service—QoS) in exchange for longer battery life. For example, upon reaching a predetermined battery charge level threshold, the instruction distributor 170 may be configured to direct all instructions to the primary GPUs 110 in order to reduce power consumption.

In another embodiment, optimization of the instruction distributor may be according to the specific instruction workloads. For example, a workload may require 5 instructions if executed on a secondary GPU, but 25 instructions if executed on the primary GPUs 110 to achieve the same result without sacrificing quality of service. In such an example, it may be more power efficient to generate from the workload instructions which can be executed by the secondary GPU. In yet another exemplary embodiment, instructions of the ISA may further include a QoS indicator, including one or more bits. The QoS indicator may be considered by the instruction distributor 170 to determine where an instruction will be sent for execution. For example, high detail graphics may be preferably executed by the secondary GPU 120, which is more precise. However, the instruction distributor 170 may override the QoS indicator in certain embodiments, for example to preserve power, in an application where low resolution (i.e., low precision graphics) for a longer period of time are more desirable than a high resolution (high precision graphics) for a short period of time.

As another example, the QoS indicator may be determined based on ambient light conditions to which the display is exposed to. In such an example, the graphic user interface (GUI) may be generated by instructions executed on either group of GPUs. However, if the display is outdoors in bright light, the GUI may be rendered using the first group of GPUs resulting in a less precise GUI, but the reduction in quality may be unnoticeable due to the contrast between the display and the ambient light.

Figure 4:
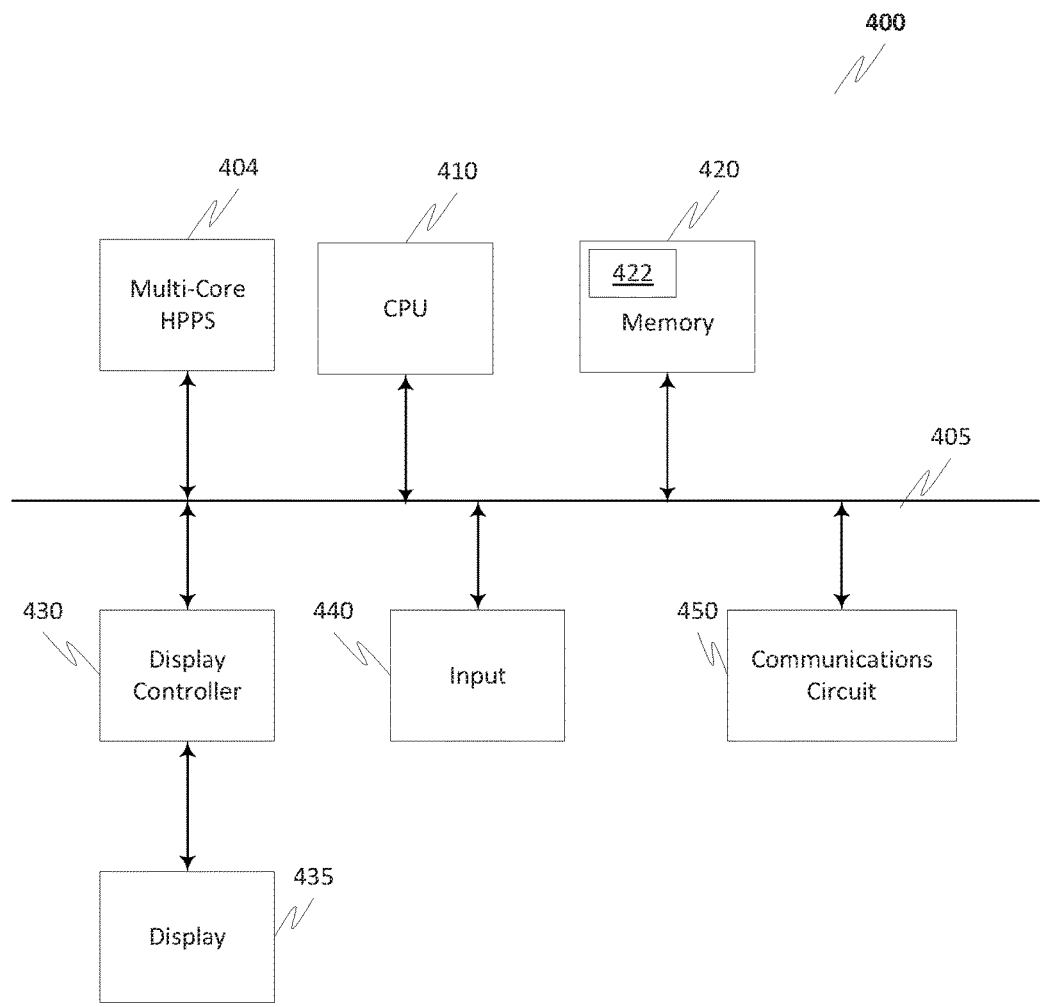
FIG. 4 is a schematic illustration of a system with an asymmetric multi-core HPPS implemented in accordance with some embodiments.

FIG. 4 is an exemplary and non-limiting schematic illustration of a system 400 with an asymmetric multi-core HPPS implemented according to an embodiment. The system 400 includes a multi-core HPPS, such as multi-core HPPS 404. The multi-core HPPS 404 may be additionally connected to a serial processing element, such as a CPU 410, which in turn may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The multi-core HPPS 404 is coupled via a bus 405 to a memory 420. The memory 420 may include a memory portion 422 that contains instructions that when executed by the processing element 410, and/or the multi-core HPPS 404 performs the method described in more detail herein. The memory 420 may be further used as a working scratch pad for the multi-core HPPS 404, the processing element 410, a temporary storage, and others, as the case may be. The memory 420 may be a volatile memory such as, but not limited to random access memory (RAM), or non-volatile memory (NVM), such as, but not limited to, Flash memory.

The system 400 further includes a display controller (DC) 430. The DC 430 is operative for controlling a display 435. The display 435 may be, for example, an LCD, OLED, and the like. In an embodiment, the display 435 may be a low-power, or ultra-low power display. The system 400 may also include an input mechanism 440. The input mechanism 440 may be a touchscreen, dial, keyboard, mouse, microphone, combinations thereof, and the like. The system may also include a communication circuit 450. The communication circuit 450 may be operative to connect the system 400 to a network. In an embodiment, the network may be configured to provide connectivity of various sorts, as may be necessary, including but not limited to, wired and/or wireless connectivity, including, for example, local area network (LAN), wide area network (WAN), low power WAN (LPWAN), metro area network (MAN), worldwide web (WWW), Internet, and any combination thereof, as well as cellular connectivity.

The multi-core HPPS 404, the processing element 410 and/or the memory 420 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 5:
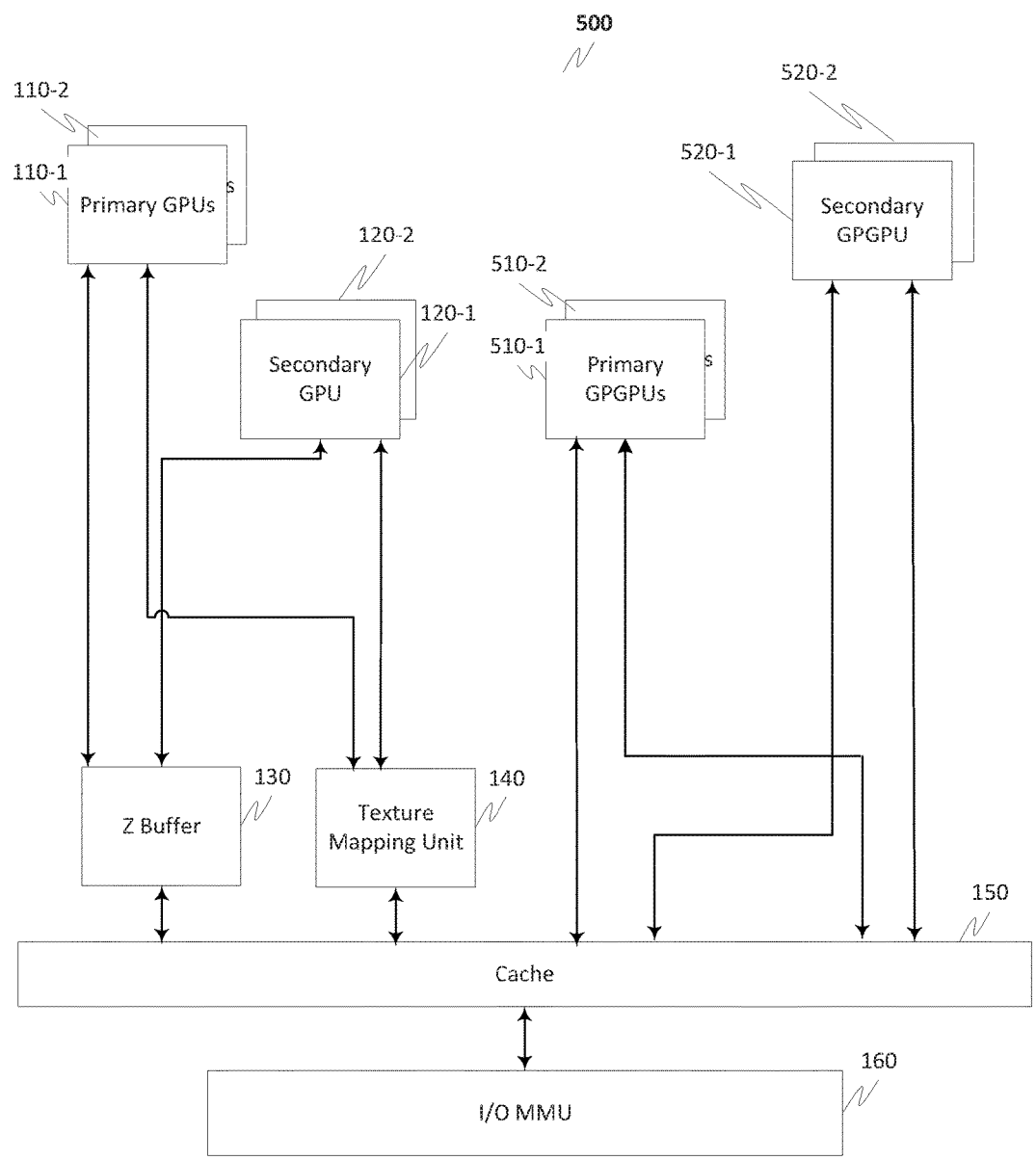
FIG. 5 is a schematic illustration of an asymmetric multi-core heterogeneous parallel processing system, implemented in accordance with yet another embodiment.

FIG. 5 is an exemplary and non-limiting schematic illustration of an asymmetric multi-core heterogeneous parallel processing system 500, implemented in accordance with yet another embodiment. The multi-core heterogeneous parallel processing system (HPPS) 500 includes a first group of homogeneous primary graphic processor units (GPUs) 110-1 and 110-2, generally referenced as first group of GPUs 110, and a second group of secondary GPU 120-1 and 120-2. In an embodiment, the first group of primary GPUs 110 may include one or more primary GPUs, each having a first microarchitecture and a first power consumption profile. A primary GPU 110 may have a fixed point data path, and a first set of instructions of an instruction set architecture (ISA). In an embodiment, the second group of secondary GPUs 120 may include one or more homogeneous secondary GPUs, each having a second microarchitecture and a second power consumption profile. The second power consumption profile is higher than the first power consumption profile, indicating that a GPU of the secondary group consumes more power than a GPU of the primary group. A secondary GPU may have a floating point data path or a floating point and a fixed point data path, and a second set of instructions of the ISA. The second set may include all, or a portion of, the first set of instructions. The fixed point data path of the secondary GPU may have higher precision than the fixed point data path of the primary GPU.

In an embodiment, the second set may include an instruction set larger than the first set of instructions. The multi-core HPPS further includes a hardware z-buffer 130, coupled to the first group of primary GPUs 110 and the secondary GPU 120. Upon rendering an object, the depth of a generated pixel, equivalent to a z-coordinate, is stored in the z-buffer 130. The multi-core HPPS further includes a texture mapping unit (TMU) 140. The TMU may be a separate processing unit, and may be used to transform a bitmap image to an arbitrary plane of a three-dimensional space. The TMU 140 and the z-buffer 130 are communicatively coupled to a cache 150. The cache 150 is further communicatively coupled to an I/O memory management unit (MMU) 160. The I/O MMU 160 manages the cache, and may perform virtual memory management as needed. The multi-core HPPS 500 further includes a third group of primary general purpose GPUs (GPGPUs) 510-1 and 510-2, generally referenced as the third group of GPGPUs 510.

In an embodiment the third group of primary GPGPUs 510 may include one or more primary GPGPUs, each having a third microarchitecture and a third power consumption profile. A primary GPGPU 510 may have a fixed point data path, and a first set of instructions of a second ISA. In an embodiment, the third microarchitecture is identical to the first microarchitecture. The multi-core HPPS includes a fourth group of secondary GPGPUs 520-1 and 520-2, generally referenced as the fourth group of secondary GPGPUs 520. In an embodiment, the fourth group of secondary GPGPUs 520 may include one or more homogeneous secondary GPGPUs, each having a fourth microarchitecture and a fourth power consumption profile. The fourth power consumption profile is higher than the third power consumption profile, indicating that a GPGPU of the fourth group consumes more power than a GPU of the third group. A secondary GPGPU may have a floating point data path, and a second set of instructions of the second ISA. The second set may include all, or a portion of, the first set of instructions of the second ISA. In an embodiment, the second set may include an instruction set larger than the first set of instructions. In some embodiments, the fourth microarchitecture is identical to the second microarchitecture. The third group of primary GPGPUs 510 and the fourth group of secondary GPGPUs 520 are communicatively connected to the cache 150. In certain embodiments, the third group of primary GPGPUs 510 and/or the fourth group of secondary GPGPUs 520 may be communicatively connected to a cache separate from cache 150. In some of the exemplary embodiments discussed above, the first group of GPUs (or GPGPUs) and the second group of GPUs (or GPGPUs) are differentiated in utilizing fixed point versus floating point. However, in other exemplary embodiments, the difference may be the number of registers, branching behavior, vectorization units, pipeline stages, operation frequency, combinations thereof, and the like.

Throughout this disclosure the terms 'heterogeneous' and 'homogeneous' are used in the context of GPU cores. Two GPU cores are considered homogeneous in that they share a microarchitecture, and an ISA. In some embodiments, homogeneous GPU cores may be differentiated by, for example, pipeline stages, cache configuration, operation frequency and/or supply voltage. Two GPU cores may be considered heterogeneous when they share a baseline ISA, and at least one GPU core has a unique instruction, and they may further be differentiated by microarchitecture.

While the examples above deal in two groups of GPU cores, it should be readily apparent that any number of different groups may be used, as long as at least two groups have a shared ISA.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), GPUs, GPGPUs, combinations thereof, a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Exemplary aspects are directed toward:

An asymmetric multi-core heterogeneous graphics processing unit (GPU), the multi-core GPU comprising:

a first group of one or more GPU cores having each a first microarchitecture and a first power consumption profile, the first group of GPU cores configured to execute a first subset of an instruction set architecture (ISA); and a second group of one or more GPU cores having each a second microarchitecture and a second power consumption profile higher than the first power consumption profile, the second group of GPU cores configured to execute the entire ISA.

Any aspect herein, further comprising a controller communicatively connected to the first group of GPU cores and the second group of GPU cores, the controller configured to receive an instruction of the ISA and determine if the instruction should be executed by a GPU of the first group of GPUs, or by a GPU of the second group of GPUs.

Any aspect herein, wherein the indicator in each instruction comprises a bit.

Any aspect herein, wherein the first group of GPU cores each have a fixed point data path.

Any aspect herein, wherein the second group of GPU cores each have a floating point data path or floating point and fixed point data path.

Any aspect herein, wherein the first group of GPU cores and the second group of GPU cores differ in: number of pipeline stages, number of registers, branching execution, vectorization units, or combinations thereof.

Any aspect herein, wherein a first subset of GPU cores operates at a first frequency, and a second subset of GPU cores operates at a second frequency.

Any aspect herein, wherein a subset of the first group of GPU cores utilize a first memory cache, and at least another GPU core of the first group utilizes a second memory cache.

Any aspect herein, wherein a first subset of the second group of GPU cores utilizes any of: the first memory cache, the second memory cache and/or the third memory cache.

Any aspect herein, wherein a first portion of a workload is executed by the first group of GPU cores, and a second portion of a workload is executed by the second group of GPU cores.

Any aspect herein, wherein the first subset comprises the entire ISA, and a portion of the instructions of the ISA executed by the second group of GPU cores has higher precision results than execution by the first group of GPU cores.

Any aspect herein, wherein the second group of GPUs is configured to execute a second subset of the ISA, the second subset of the ISA comprising at least one instruction from the first subset, and another instruction of the ISA unique to the second subset.

Any aspect herein, wherein a portion of the instructions of the ISA further comprise an indicator to determine if the instruction should be executed by a GPU of the first group of GPUs, or by a GPU of the second group of GPUs.

Any aspect herein, further comprising an instruction distributor communicatively coupled with the first group of GPU cores and the second group of GPU cores, operative for determining if the instruction should be executed by a GPU of the first group of GPUs, or by a GPU of the second group of GPUs.

Any aspect herein, wherein a portion of the instructions of the ISA further comprise an indicator to determine a quality of service (Qos) level for execution of the instruction.

An asymmetric multi-core heterogeneous graphics processing unit (GPU) comprising:
a first group of one or more GPU cores having each a first microarchitecture and a first power consumption profile, the first group of GPU cores configured to execute a first subset of an instruction set architecture (ISA);
a second group of one or more GPU cores having each a second microarchitecture and a second power consumption profile higher than the first power consumption profile, the second group of GPU cores configured to execute the entire ISA;
a first z buffer connected to the first group of one or more GPU cores;
a first texture mapping unit connected to the first group of one or more GPU cores; and
one or more caches connected to the one or more of the first z buffer and the first texture mapping unit.

Any aspect herein, further comprising:
a second z buffer connected to the second group of one or more GPU cores;
a second texture mapping unit connected to the second group of one or more GPU cores; and
a second cache connected to the one or more of the second z buffer and the second texture mapping unit.

Any aspect herein, further comprising one or more primary general purpose GPUs connected to one or more of the one or more caches.

Any aspect herein, further comprising one or more secondary general purpose GPUs connected to one or more of the one or more caches.

Any aspect herein, further comprising an input/output memory management unit connected to one or more of the one or more caches.

A system on a chip (SoC) including any one or more of the above aspects.

One or more means for performing any one or more of the above aspects.

Any one or more of the aspects at least as substantially described herein.

For purposes of explanation, numerous details are set forth in order to provide a thorough understanding of the present embodiments. It should be appreciated however that the techniques herein may be practiced in a variety of ways beyond the specific details set forth herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a computing, entertainment or communications device.

It is therefore apparent that there has at least been provided systems and methods for enhancing and improving processing. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. An asymmetric multi-core heterogeneous graphics processing unit (GPU), the multi-core GPU comprising:
a first group of one or more GPU cores having each a first microarchitecture and a first power consumption profile, the first group of GPU cores configured to execute a first subset of an instruction set architecture (ISA); and
a second group of one or more GPU cores having each a second microarchitecture and a second power consumption profile higher than the first power consumption profile, the second group of GPU cores configured to execute the first subset of the ISA and a second subset of the ISA, wherein the second subset of the ISA includes at least an instruction not present in the first subset of the ISA, wherein the GPUs of both groups contain hardware logic to receive and execute instructions belonging to the same instruction stream that is part of an executable file, and further wherein a portion of the instructions of the ISA further comprise an indicator to determine if the instruction should be executed by a GPU of the first group of GPUs, or by a GPU of the second group of GPUs.

2. The multi-core GPU of claim 1, further comprising a controller communicatively connected to the first group of GPU cores and the second group of GPU cores, the controller configured to receive an instruction of the ISA and determine if the instruction should be executed by a GPU of the first group of GPUs, or by a GPU of the second group of GPUs.

3. The multi-core GPU of claim 2, wherein each instruction comprises an indicator bit so that the controller may determine if the instruction can be executed on: a GPU of the first group of GPU cores, a GPU of the second group of GPU cores, or on both.

4. The multi-core GPU of claim 1, wherein the first group of GPU cores each have a fixed point data path.

5. The multi-core GPU of claim 1, wherein the second group of GPU cores each have a floating point data path or floating point and fixed point data path.

6. The multi-core GPU of claim 1, wherein the first group of GPU cores and the second group of GPU cores differ in: number of pipeline stages, number of registers, branching execution, vectorization units, or combinations thereof.

7. The multi-core GPU of claim 1, wherein a first subset of GPU cores operates at a first frequency, and a second subset of GPU cores operates at a second frequency.

8. The multi-core GPU of claim 1, wherein a subset of the first group of GPU cores utilize a first memory cache, and at least another GPU core of the first group utilizes a second memory cache.

9. The multi-core GPU of claim 6, wherein a first subset of the second group of GPU cores utilizes any of: the first memory cache, the second memory cache and/or the third memory cache.

10. The multi-core GPU of claim 1, wherein a first portion of a workload is executed by the first group of GPU cores, and a second portion of the workload is executed by the second group of CPU cores.

11. The multi-core GPU of claim 1, wherein the first subset comprises one of more instructions that when executed by the second group of GPU cores has higher precision results than execution by the first group of GPU cores.

12. The multi-core GPU of claim 1, wherein the second group of GPUs is configured to execute a second subset of the ISA, the second subset of the ISA comprising at least one instruction from the first subset, and another instruction of the ISA unique to the second subset.

13. The multi-core GPU of claim 1, further comprising an instruction distributor communicatively coupled with the first group of GPU cores and the second group of GPU cores, operative for determining if the instruction should be executed by a GPU of the first group of GPUs, or by a GPU of the second group of GPUs.

14. The multi-core GPU of claim 1, wherein a portion of the instructions of the ISA further comprise an indicator to determine a quality of service (Qos) level for execution of the instruction.

15. An asymmetric multi-core heterogeneous graphics processing unit (GPU) comprising:
a first group of one or more GPU cores having each a first microarchitecture and a first power consumption profile, the first group of GPU cores configured to execute a first subset of an instruction set architecture (ISA);
a second group of one or more GPU cores having each a second microarchitecture and a second power consumption profile higher than the first power consumption profile, the second group of GPU cores configured to execute the first subset of the ISA and a second subset of the ISA, wherein the second subset of the ISA includes at least an instruction not present in the first subset of the ISA, wherein a portion of instructions of the ISA further comprise an indicator to determine if the instruction should be executed by a GPU of the first group of GPUs, or by a GPU of the second group of GPUs;
a first z buffer connected to the first group of one or more GPU cores;
a first texture mapping unit connected to the first group of one or more GPU cores; and
one or more caches connected to the one or more of the first z buffer and the first texture mapping unit, wherein the GPUs of both groups contain hardware logic to receive and execute instructions belonging to the same instruction stream that is part of an executable file.

16. The asymmetric multi-core heterogeneous graphics processing unit (GPU) of claim 15, further comprising:
a second z buffer connected to the second group of one or more GPU cores;
a second texture mapping unit connected to the second group of one or more GPU cores; and
a second cache connected to the one or more of the second z buffer and the second texture mapping unit.

17. The asymmetric multi-core heterogeneous graphics processing unit (GPU) of claim 15, further comprising one or more primary general purpose GPUs connected to one or more of the one or more caches.

18. The asymmetric multi-core heterogeneous graphics processing unit (GPU) of claim 17, further comprising one or more secondary general purpose GPUs connected to one or more of the one or more caches.

19. The asymmetric multi-core heterogeneous graphics processing unit (GPU) of claim 15, further comprising an input/output memory management unit connected to one or more of the one or more caches.

* * * * *